United States Patent [19]
Butler et al.

[11] 3,887,758
[45] June 3, 1975

[54] OIL RESISTANT LEATHER

[75] Inventors: Anthony J. Butler; Daniel R. Pail, both of Midland, Mich.

[73] Assignee: Dow Corning Corporation, Midland, Mich.

[22] Filed: Apr. 19, 1974

[21] Appl. No.: 462,274

[52] U.S. Cl. .................................................. 428/540
[51] Int. Cl. ................................................. B44d 1/32
[58] Field of Search ............ 117/142, 124 F, 135.1, 117/55, 161 ZA, 161 UT; 260/825, 826

[56] References Cited
UNITED STATES PATENTS

| | | | |
|---|---|---|---|
| 2,678,893 | 2/1951 | Kauppi | 117/142 |
| 2,924,587 | 2/1960 | Shorr | 117/142 |
| 3,364,160 | 1/1968 | Gölitz et al. | 260/825 |
| 3,419,514 | 12/1968 | Hadlock | 260/33.4 R |
| 3,576,905 | 4/1971 | McKellar et al. | 260/825 |
| 3,636,134 | 1/1972 | Antonen | 260/825 |

Primary Examiner—Leon D. Rosdol
Assistant Examiner—Charles R. Wolfe, Jr.
Attorney, Agent, or Firm—Robert F. Fleming, Jr.

[57] ABSTRACT

Oil resistant leather articles are prepared by impregnating the leather with a room temperature curing organosilicon resin made by mixing (1) 1 to 65 percent by weight of a hydroxyl endblocked dimethylpolysiloxane, (2) from 15 to 70 percent by weight of a hydroxyl containing phenylsiloxane resin and (3) 5 to 65 percent by weight of a silane of the formula $RSiX_3$ and thereafter allowing the mixture to cure. The leather is particularly useful for work shoes around areas where the shoes are exposed to solvents, oils or hydraulic fluids.

5 Claims, No Drawings

OIL RESISTANT LEATHER

BACKGROUND OF THE INVENTION

The use of organosilicon compounds to coat and impregnate leather is well known. The best prior commercial material for rendering leather water repellent is that described in Re. No. 23,879 which shows impregnating leather with an organotitanate, a particular kind of organosilicon resin and an organosilicon fluid. However, the proportions of ingredients employed in this invention are such that the impregnating material does not cure. This is the secret of its success as far as being the best silicone water repellent known for leather. In fact, shoes or boots impregnated with this material can be repeatedly flexed under water without water penetrating the leather. However, since the organosilicon compound has not been cured it remains soluble in organic solvents and in oils. For this reason, oils will easily penetrate the leather and this particular combination of organosilicon compounds is, therefore, not useful in those applications in which leather is exposed to excessive amounts of oils or solvents.

It is also shown in U.S. Pat. No. 2,568,384 that copolymers of diorganosiloxanes and monoorganosiloxanes can be used to treat leather. These copolymers, however, are prepared by cohydrolysis of the corresponding monomeric silanes. As is well known, such cohydrolyzates contain unreacted silicon-bonded hydroxyl groups. In order to cure such resins in a reasonable length of time, it is necessary to heat the resin at temperatures well above 100°C. If this condition is not met, the resin is not properly cured and hence remains partially soluble. When such resins are fully cured, they are brittle. It is interesting to note that this patent teaches the use of plasticizers such as tricresyl phosphate and the like in order to plasticize more fully the resin films. Furthermore, this patent has no teaching whatsoever that leather so coated or treated would in any way be oil repellent.

Also it is known from U.S. Pat. No. 2,911,327 that leather can be coated with a combination of a methyl hydrogen siloxane and a diorganosiloxane gum which combination is then cured. This leather article is designed primarily to allow a control penetration of the oil through the leather in order to lubricate metal parts on the other side of the leather article. Obviously, an article designed for control penetration of oil is not applicable in those applications where the objective is to prevent penetration of the leather by the oil or other material.

Applicants have found that when the particular compositions of this invention are employed to impregnate the leather, that the leather article can be cured at room temperature and one will obtain a leather which is resistant to oil under normal conditions.

BRIEF DESCRIPTION OF INVENTION

This invention relates to a method of preparing an oil resistant leather which comprises impregnating the leather with an organosilicon resin curable at room temperature said resin having been prepared by mixing (1) from 1 to 65 percent by weight of a hydroxylated dimethylpolysiloxane having on the average from 5 to 50 siloxane units per molecule which can contain up to 10 mol percent monomethylsiloxane units, (2) from 15 to 70 percent by weight of a hydroxyl containing resin having a phenyl to silicon ratio of at least 0.3, a hydrocarbon radical to silicon ratio of 1 to 1.5 in which the hydrocarbon radicals are of the group consisting of phenyl and methyl, and (3) from 5 to 65 percent by weight of a silane of the formula $RSiX_3$ in which X is acetoxy, lower alkoxy, $-ON=CR'_2$, $-NR'_2$, $-ONR'_2$ or $-NR'(O=CR')$ in which R is an aliphatic hydrocarbon radical of 1 to 2 carbon atoms and R' is a lower alkyl radical and thereafter allowing the resin to cure.

In essence, this invention relates to a leather article which has within the pores of the leather a cured block copolymer in which the blocks are of preformed diorganosiloxane blocks and phenyl resin siloxane blocks. The resinous block copolymers are cured by means of the silane $RSiX_3$.

DETAILED DESCRIPTION OF THE INVENTION

In preparing the leather article, two basic methods can be employed. First, one can merely mix ingredients (1), (2) and (3) in a suitable solvent and thereafter impregnate the leather with the mixture. Upon removal of the solvent and exposure to moisture, the combination will cure forming the block copolymer of this invention and curing the mixture at the same time. It is possible, of course, that some coupling of (1) and (2) takes place while in solution due to reaction with (3).

A second basic method involves prereacting (1) and (2) prior to impregnating the leather or prereacting (1), (2) and (3) prior to impregnating the leather. The leather is then impregnated with this prereacted combination and the resulting cured resin is a block copolymer similar to that obtained by the first method.

The first of these methods can be carried out using the materials of U.S. Pat. No. 3,419,514 which shows mixing (1), (2) and (3) and thereafter applying the mixture to a cooking utensil and allowing the resin to cure. The second basic method can be carried out using the materials of, for example, U.S. Pat. No. 3,328,481 (which have been mixed with or reacted with (3) ), 3,636,134, 3,576,905, and 3,629,228, all five of which patents are incorporated herein by reference. Basically, these latter patents show the precoupling of (1) and (2) employing a silane of the formula $RSiX_3$. The resulting coupled (1) and (2) are then reacted with (3) and the resulting product is a room temperature curing resin. Other variations in preparing the compositions of this invention will be obvious from a perusal of the above patents.

Ingredients (1) employed herein are siloxanes of the formula

in which $x$ has an average value from 5 to 50. These siloxanes can contain up to 10 mol percent monomethylsiloxane units in which case (1) can have configurations such as

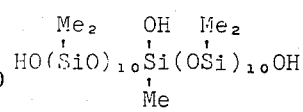

or 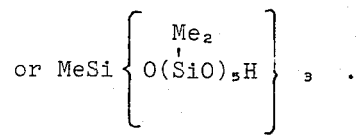

Materials of type (1) are well known.

Ingredient (2) contains silicon-bonded hydroxyl groups and can be monophenylsiloxane or resin copolymers in which the siloxane units are any combination of $PhSiO_{3/2}$, $Ph_2SiO$, $PhMeSiO$, $Me_2SiO$, $MeSiO_{3/2}$ or $SiO_2$ units provided there is at least 0.3 Ph per Si and a total of, on the average, from 1 to 1.5 phenyl plus methyl radicals per Si.

Crosslinkers (3) are silanes in which R is methyl, ethyl or vinyl and X is acetoxy, a lower alkoxy radical such as methoxy, ethoxy, isopropoxy, butoxy, beta-methoxyethoxy or beta-ethoxyethoxy or radicals of the formulae $-ON=CR'_2$, $-ONR'_2$, $-NR'_2$ or

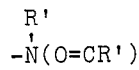

in which R' is a lower alkyl radical such as methyl, ethyl or butyl.

If desired, a curing catalyst can be employed with the compositions of this invention. These catalysts can be any of the types shown in the above named patents which are known to be catalysts for the reaction of SiOH with SiX groups and catalysts for the condensation of SiOH groups with each other. Briefly, these catalysts comprise organometallic compounds such as dibutyltin diacetate, dibutyltin dilaurate, stannous octoate or lead 2-ethylhexoate; organotitanates such as tetrabutyl titanate; amines such as hexyl amine; or amine salts such as hexyl amine acetate.

The impregnation of the leather can be carried out by any conventional means. It is important that the leather be impregnated and this can be done by applying the solution to the surface of the leather with a dauber. The solution can be applied either to the finished side or the flesh side of the leather. Alternatively, the leather may be soaked in a solution of the resin. It is important, of course, that the solutions be kept in an anhydrous condition until after the leather has been impregnated, otherwise the composition will gel and be rendered inoperative.

For the purpose of this invention, any suitable anhydrous solvent can be employed which does not react with the X groups. In general, this includes hydrocarbons, such as toluene or aliphatic hydrocarbons or halohydrocarbons such as perchloroethylene or 1,1,1-trichloroethane. The best results are obtained by employing chlorinated solvents for they seem to impregnate the leather more efficiently.

The concentration of the solution used to impregnate the leather is not critical although it has been found that concentrations of from 1 to 5 percent are sufficient for the purpose of this invention. After the leather has been impregnated, it is allowed to cure. This can be accomplished by merely exposing the treated leather to the atmosphere or, if desired, mild heating can be employed to hasten the cure.

The composition of this invention is employable with any type of leather such as cowhide, calfskin, pigskin or the like and can be used with any type of leather articles such as shoes, boots, gloves, leather belts, harnesses, etc. It is particularly adaptable for use on leather which is exposed to oils and solvents in working conditions such as around aircraft or other automotive vehicles or in machine shops.

The penetration of the oils and solvents shown in the examples below was rated visually by a code as follows: 0 represents no spots whatsoever, 1 slight spotting but no penetration, 2 moderate spotting no penetration, 3 severe spotting no penetration, 4 penetration but the reverse side not stained, 5 total saturation reverse side stained. Samples judged to fall between two ratings are designed by adding 0.5 to the lower number.

The following examples are illustrative only and should not be construed as limiting the invention which is properly delineated in the appended claims. In the specification, the following abbreviations are used: Me for methyl, Et for ethyl, and Ph for phenyl.

EXAMPLE 1

The formulations used in this example were as follows:

A. A mixture in percent by weight of (1) 1.79 percent methyltriacetoxy silane, (2) 0.20 percent

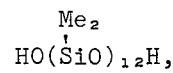

(3) 0.01 percent of the monomethyl ether of dipropylene glycol, 2.94 percent xylene (4) 1.66 percent of a methylphenylpolysiloxane resin containing 4 percent by weight silicon-bonded hydroxyl groups, a phenyl-to-silicon ratio of 0.56 and a methyl plus phenyl-to-silicon ratio of 1.35, 0.27 percent by weight dioctyltindiisooctyl mercapto acetate, and 93.13 percent by weight perchloroethylene. This formulation was prepared by mixing (1), (2), (3) and the perchloroethylene and then adding (4) in the form of a 50 percent xylene solution. The tin catalyst was added last.

B. A second solution was prepared except that additional perchloroethylene was used so that the combined weights of (1), (2) and (4) amounted to 2.2 percent of the total.

C. 100 g. of formulation A was diluted with an equal volume of an aliphatic hydrocarbon solvent sold under the name Varsol No. 3.

Each of the above formulations was applied to duplicate samples of leather with a dauber and allowed to cure for 24 hours at room temperature before testing. In each case, 5 drops of the various materials shown below were placed on the surface of the impregnated leather, allowed to penetrate for the times shown in parentheses and then wiped off. The leather was graded visually by the code shown above.

| Material Used | A | B | Penetration C* | Blank** |
|---|---|---|---|---|
| Stauffer Type No. 2 | 1 (5 min.), 2 (30 min.) | 1 (5 min.), 1.5 (30 min.) | 1 | 5 |
| Pydraul A-200 | — | — | 1 | 5 |
| Houghton's 1120 | — | — | 1.5 | 5 |
| Perchloroethylene | 1 (5 min.) | 2 (5 min.) | 2 | 5 (15 sec.) |
| SOS Cutting Oil | — | — | 2 | 5 |
| 20 Weight Motor Oil | 1 (30 min.) | 1 (30 min.) | 3 | 5 |

*In C each drop was left on the leather for 5 min. before being removed.
**In each case the oil was allowed to penetrate the blank for the same time as the treated samples.

It is noted that no penetration occurred with any of the treated samples while the oil completely penetrated the blanks. In the above table, Stauffer Type No. 2 and Houghton's 1120 are both polyester hydraulic fluids, Pydraul A-200 is a phosphate ester hydraulic fluid and the SOS Cutting Oil is a hydrocarbon oil dissolved in kerosene.

EXAMPLE 2

Formulation A of Example 1 was applied to work shoes using one coat from the dauber and used in various work locations where the leather was exposed to spills and splashes of various oils and solvents to which the shoes were normally exposed during the work day. At the first location, the shoes were exposed to lacquer thinner paint, and wax cutting oil for 5 weeks and there was no penetration of the leather. In the second location, the shoes were exposed to polyester hydraulic fluids such as Skydrol 500 and 300, acetone and trichloroethylene for 7 weeks. There was no penetration of the leather.

By contrast, untreated shoes were severely damaged under the same conditions.

EXAMPLE 3

Equivalent results are obtained when leather is impregnated with the following composition and allowed to cure and tested as in Example 1. The composition is a mixture of 987 parts by weight

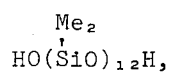

$HO(SiO)_{12}H$, with Me$_2$ on Si, 1183 parts by weight MeSi(ON=CEtMe)$_3$ and 1176 parts by weight of a methylphenylpolysiloxane resin containing silicon-bonded hydroxyl groups and having a phenyl-to-silicon ratio of 0.65 and a methyl plus phenyl to silicon ratio of 1.15. This formulation was diluted to 3 percent by weight in 1,1,1-trichloroethane.

EXAMPLE 4

500 g. of a hydroxyl endblocked siloxane of the formula

$HO(SiO)_{35}H$, with Me$_2$ on Si, was reacted with 115.2 g. of CH$_2$=CHSi(ON=CEtMe)$_3$ in 1464.8 g. of toluene for 1 hour at room temperature and the resulting product was coupled with 500 g. of a siloxane resin consisting of 90 mol percent PhSiO$_{3/2}$ and 10 mol percent PhMeSiO and containing 6.4 weight percent siliconbonded OH groups and 392 g. of toluene was added. To the solution of the resulting block copolymer 508 g. of CH$_2$=CHSi(ON=CEtMe)$_3$ was added and the solution agitated one hour at room temperature and then stripped of solvent at 10 mm. of Hg. to a temperature of 100°C. The resulting block copolymer contained CH$_2$=CHSi(ON=CEtMe)$_2$O$_{.5}$ groups to act as curing sites.

When this block copolymer is diluted to 2.5 percent in perchloroethylene and impregnated into leather in accordance with the procedure of EXample 1, equivalent results are obtained.

EXAMPLE 5

17.5 parts by weight

$HO(SiO)_{34}H$, with Me$_2$ on Si, was mixed with 56.8 parts by weight toluene and 3.9 parts MeSi(ON=CEtMe)$_3$ and allowed to react for 1 hour at 30°C. To the resulting solution was added 35.4 parts of 65.5 percent by weight toluene solution of a siloxane resin copolymer of 90 mol percent PhSiO$_{3/2}$ and 10 mol percent PhMeSiO and the mixture was heated 280°C. for 40 minutes to couple the resin to the dimethylpolysiloxane. The resulting product was a block copolymer containing 4.5 weight percent silicon-bonded OH groups.

The solution was cooled and 11.7 parts by weight MeSi(OMe)$_3$ and 0.2 parts tetraisopropyltitanate was added and the temperature increased to 47°C. Thereafter 0.2 parts by weight n-hexyl amine was added to the solution which was heated at 80°C. for 30 minutes. Toluene and by-produced methanol were removed by heating at 20 mm. of Hg. to a temperature of 100°C. The resulting product was a block copolymer containing MeSi(OMe)$_2$O$_{.5}$ units.

When this material is diluted to 3 percent by weight in carbon tetrachloride and impregnated into leather by the method of Example 1, equivalent results are obtained.

EXAMPLE 6

When the following silanes are substituted for the MeSi(ON=CEtMe)$_3$ of Example 3, equivalent results are obtained:

$$MeSi\{N(C_3H_7)_2\}_3$$

$$EtSi(ONMe_2)_3$$

$$MeSi\{NMe(O=CMe)\}_3$$

EXAMPLE 7

Equivalent results are obtained when leather is impregnated with a mixture of a block copolymer of 50 percent by weight

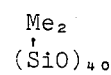

$(SiO)_{40}$, with Me$_2$ on Si, blocks and 50 weight percent PhSiO$_{3/2}$ blocks which block copolymer contains SiOH groups with a silane of the formula CH$_2$=CHSi(ON=CMe$_2$)$_3$ in accordance with the procedure of Example 3 and thereafter allowing the mixture to cure. The weight proportions of block copolymer to silane are 50 to 25.

That which is claimed is:

1. A method of preparing an oil resistant leather which comprises impregnating the leather with an organosilicon resin curable at room temperature, said resin having been prepared by mixing
    1. from 1 to 65 percent by weight of a dimethylpolysiloxane containing silicon-bonded hydroxyl groups having on the average from 5 to 50 siloxane units per molecule which can contain up to 10 mol percent monomethylsiloxane units, 2. from 15 to 70 percent by weight of a siloxane resin containing silicon-bonded hydroxyl groups having a phenyl-to-silicon ratio of at least 0.3, a hydrocarbon radical to silicon ratio of 1 to 1.5 in which the hydrocarbon radicals are of the group consisting of phenyl and methyl, and 3. from 5 to 65 percent by weight of a silane of the formula $RSiX_3$ in which X is acetoxy, lower alkoxy, $-ON=CR'_2$, $-NR'_2$, $-ONR'_2$ or $-NR'(O=CR')$ in which R is an aliphatic hydrocarbon radical of 1 to 2 carbon atoms and R' is a lower alkyl radical and thereafter allowing the resin to cure.

2. A leather article prepared by the method of claim 1.

3. A leather article prepared by the method of claim 1 in which X is acetoxy.

4. A leather article prepared by the method of claim 1 in which X is $-ON=CCH_3(C_2H_5)$.

5. A leather article prepared by the method of claim 1 in which X is methoxy.

* * * * *